United States Patent [19]

Alaiwan

[11] Patent Number: 5,357,612
[45] Date of Patent: Oct. 18, 1994

[54] MECHANISM FOR PASSING MESSAGES BETWEEN SEVERAL PROCESSORS COUPLED THROUGH A SHARED INTELLIGENT MEMORY

[75] Inventor: Haissam Alaiwan, Cagnes sur Mer, France

[73] Assignee: International Business Machines Corporation, Armonk, N.Y.

[21] Appl. No.: 91,117

[22] Filed: Jan. 11, 1993

Related U.S. Application Data

[63] Continuation of Ser. No. 644,046, Jan. 22, 1991, abandoned.

[30] Foreign Application Priority Data

Feb. 27, 1990 [EP] European Pat. Off. ........ 90480029.9

[51] Int. Cl.$^5$ ...................... G06F 13/38; G06Z 12/00; G06Z 15/56
[52] U.S. Cl. .............. 395/200; 364/DIG. 1; 364/228.1; 364/244.3; 364/229.0
[58] Field of Search ................ 395/200; 364/DIG. 1, 364/228.1, 244.3, 229.0

[56] References Cited

U.S. PATENT DOCUMENTS 4,590,554 5/1986 Glazer et al. .................. 364/200
4,674,033 6/1987 Miller ............................ 364/200

OTHER PUBLICATIONS

Milan Milenkovic, "Operating Systems Concepts and Design", 1987 pp. 189–190, McGraw Hill.

*Primary Examiner*—Gareth D. Shaw
*Assistant Examiner*—A. Katbab
*Attorney, Agent, or Firm*—John J. Timar

[57] ABSTRACT

In the environment of a plurality of processors interconnected by a shared intelligent memory, a mechanism for the secure passing of messages between tasks operated on said processors is provided. Inter-task message passing is provided by shared intelligent memory for storing the messages transmitted by sending tasks. Further, each processor includes serving means for getting the messages to be sent to the task operated by said each processor. The passing of messages from a processor to the shared intelligent memory and from the latter to another processor is made, using a set of high-level microcoded commands. A process is provided using the message passing mechanism together with redundancies built into the shared memory, to ensure fault-tolerant message passing in which the tasks operated primarily on a processor are automatically replaced by back-up tasks executed on another processor if the first processor fails.

6 Claims, 4 Drawing Sheets

FIG.1

BEFORE A DEQ OPERATION

AFTER A DEQ

MECHANISM FOR PASSING MESSAGES BETWEEN SEVERAL PROCESSORS COUPLED THROUGH A SHARED INTELLIGENT MEMORY

This is a continuation of U.S. Ser. No. 07/644,046, filed Jan. 22, 1991, now abandoned.

FIELD OF THE INVENTION

The present invention relates to a mechanism for passing messages between several processors coupled through a shared intelligent memory, and to a fault-tolerant protocol using said mechanism for determining, upon failure of a given processor, which processors will run back-up tasks to remedy the non-execution of primary tasks affected by the failing processor.

BACKGROUND ART

Technological advances have made it possible to interconnect many low cost processors and memories to build powerful, cost effective computer systems. Distributing computation among the processors allows increases in performance because of improved parallel execution. The performance of such multiprocessor systems depends on many factors such as flow control mechanisms, scheduling, the interconnection scheme between the processors and the implementation of inter process communication.

Another gain due to distributed computation is added robustness against single processor failures. This additional robustness is effective only if the connection medium between the processors is extremely reliable compared to processor components. Given that this very high reliability is hard to achieve, the processors, mainly in fault tolerant machines, are connected to redundant transport mechanisms (duplicate bussing system or redundant shared memory), with special microcode functions that switch from one medium to another upon the detection of a failure on the first one.

Moreover, the trend in the industry today is to give this multi processing machine a single system image, which means that the application programmer is not aware of the distribution of computation on several processors, so he/she can concentrate on the development of his/her program independently from the underlying hardware structure. In this scheme, the single system image is totally handled by the lower layers of the software (operating system and drivers).

Finally, fault tolerant machines are getting more and more commonplace because there is a need in the computer market for permanent service (airline control, banking and so on). Many of these machines like the one described in French Patent 2 261 568 are architected as a set of processors each of which can be replaced by another upon detection of a failure. In such a case, a control unit saves information from which the back-up processor can replace the failing processor and execute its tasks.

However, one of the major problems left aside by the cited prior approach is the absence of a secure message passing mechanism between processors, enabling said processor to communicate, either for normal use as an inter processor communication device, or for ensuring that, from a fault-tolerance point of view, a backup processor be provided with the last consistent data states used by the failing processor, just before failure.

OBJECTS OF THE INVENTION

Therefore, it is an object of the invention to provide a mechanism for passing messages between tasks executed by processors, said tasks being either executed on the same processor, or on different processors connected together by a loosely coupled device.

It is a further object of the invention to provide a method, using said message passing mechanism, to ensure fault tolerant intra-processor or inter-processor message passing.

Further, according to another object of the invention, all the message passing is to be done without altering the First-in First-out order of messages received or transmitted by tasks operated on a single or on different processors.

It is still another object of the invention to provide a fault-tolerant message passing mechanism in the particular situation wherein all the processors are loosely coupled through an intelligent shared memory, as the one described in European patent application No. 88480102.8 filed by same applicant.

SUMMARY OF THE INVENTION

According to the present invention, in the environment of a plurality of processors interconnected by a shared intelligent memory, a mechanism for the secure passing of messages between tasks operated on said processors is provided. For inter-task message passing, means are provided within the shared intelligent memory for storing the messages transmitted by sending tasks, and further, each processor includes serving means for getting the messages to be sent to the task operated by said each processor. The passing of messages from a processor to the shared intelligent memory and from the latter to another processor is made, using a set of high-level microcoded commands.

Further according to the invention, a process is provided, using the above cited message passing mechanism together with redundancies built into the shared memory, to ensure a fault-tolerant message passing, wherein the tasks operated primarily on a processor, are automatically replaced by back-up tasks executed on another processor if the first processor comes to fail.

One of the advantages of the mechanism and process according to the invention is the increase of the granularity of the fault-tolerant message-passing, since when several tasks are executed on a given processor, the fault-tolerant message passing is possible not only on a processor to processor communication level, but also on a task to task communication level.

Further, the mechanism and process according to the invention allows the differentiation of tasks that are to be handled in a fault-tolerant manner, and tasks for which fault-tolerant message passing is not compulsory, which allows minimization of the processing power overhead due to intertask communication.

Further features and advantages of the present invention will be described in the detailed description, with reference to the accompanying drawings.

DETAILED DESCRIPTION OF THE INVENTION

Figure 1:
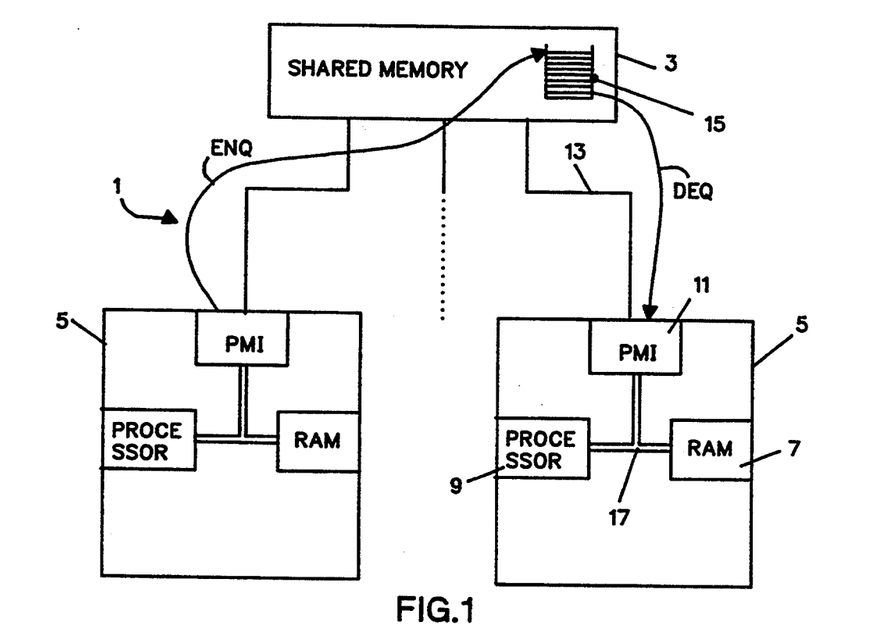
FIG. 1 represents the general structure of the machine constituting the environment wherein the invention may be used.

FIG. 1 shows a multiprocessor structure (1) wherein a plurality of processing units (5) are connected to a shared intelligent memory (3) by means of busses (13). The objects exchanged between the processing units (5), using the shared memory (3), are messages enqueued into and dequeued from queues (15). The objects stored within the shared memory (3) can thus be shared between all the processing units (5), and are accessible through a set of high-level commands submitted to the shared memory by the processors (9) of the processing units, through memory interfaces PMI (11). Such a structure and the corresponding high-level commands have already been described in detail in a European patent application No. 88480102.8 of same applicant.

It is to be noted that individual processors (9) all run their own operating system, so that different operating systems may coexist in the same system structure.

Each individual processor of a processing unit is connected to a local RAM memory (7) by a local bus (17).

Although the basic operation of the system (1) shown in FIG. 1, and the corresponding high level commands have already been described in the above cited patent application, said high level commands or primitives, will be rapidly described again herein, for more clarity. Further details of the system and primitives are incorporated herein by way of reference to said prior application.

ENQUEUE primitive: (ENQ)

The ENQ primitive is used by a processor to enqueue an element in a queue located in the shared memory. The primitive uses three parameters:
 a pointer to an address in the local RAM,
 a message length (or number of bytes),
 and an Address Space Token of a queue in the Shared Memory.

All these parameters are passed by the processor to the PMI, which enqueues a copy of the message in the specified shared memory queue.

DEQUEUE primitive (DEQ)

The DEQ primitive is used to dequeue one, several or all elements from a shared memory queue. It uses the following parameters:
 AST This is the address space token of the queue;
 MAX This is the maximum number of elements that the processor intends to receive.
 INDEX This is a parameter set by the PMI, which indicates an index for the first dequeued element.
 n This is the real number of dequeued elements; it is set by the PMI.

The processor sets first the value of 'max' according to the available storage in its local memory. Supplying this value prevents the PMI from flooding the local memory with a large number of elements while attempting to empty the queue. The 'n' parameter is therefore always inferior or equal to 'max'. If n is not equal to 'max', this implies that the DEQ operation retrieved all the elements from the queue. If n is equal to 'max', the number of remaining elements in the queue is unknown.

We recall that when an element is dequeued from a shared memory queue, it is not erased from the shared memory; actually the element is 'purged' from the shared memory with the PURGE primitive.

PURGE

To erase an element from a queue, a PURGE on this element should be used. The PURGE primitive uses an 'index' as a parameter, set by the processor; this index is the sum of the one supplied by the PMI upon a DEQ operation, plus a count calculated by the processor.

Figure 2:
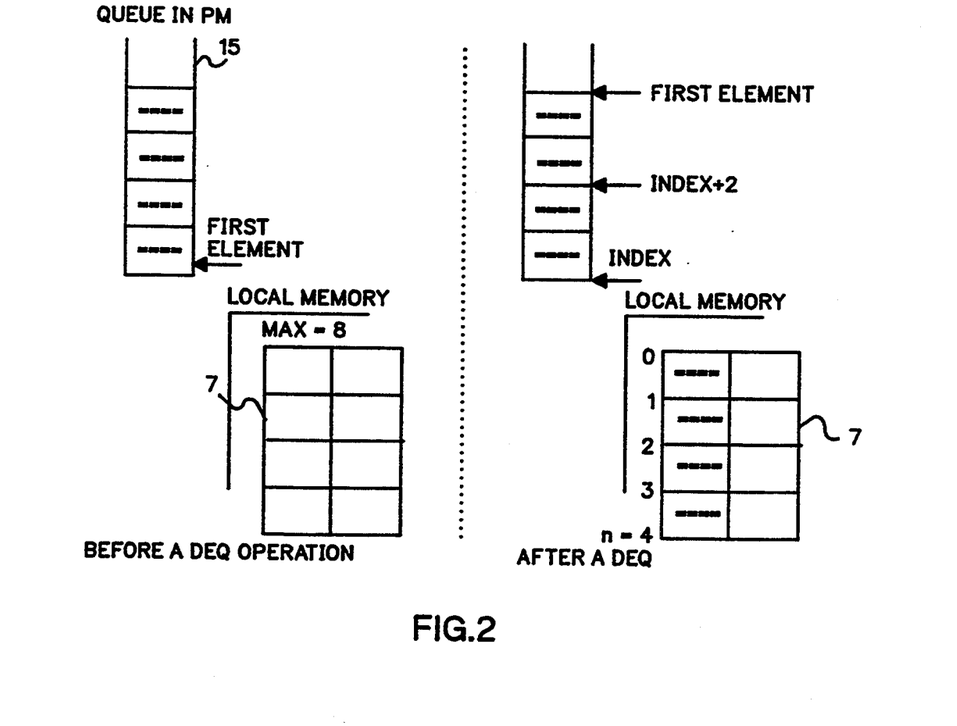
FIG. 2 represents the operation of a specific DEQUEUE command used in the system of FIG. 1.

In fact, the DEQ operation yields an index for the first dequeued element; to be able to purge any element within the dequeued ones, a displacement number with regard to the first element is added to the index. FIG. 2 shows the use of the different parameters.

In FIG. 2, before the DEQ, the shared memory queue (15) contains 4 elements; the processor specifies to the PMI that it has room for up to 8 elements. After the DEQ, 4 elements are dequeued (but not purged) and loaded into local memory (7), and an 'index' is delivered so it can be used during a further PURGE operation.

The PURGE primitive is a key function for the implementation of secure message passing. In fact, when a message is retrieved from the shared memory, this does not imply that the target task performed the corresponding processing. In other words, if a message is dequeued from the shared memory, but the receiving processor crashes during the treatment of the message and if the message was really erased from tile shared memory, the failing task cannot recover since the message is lost forever. Thus, the PURGE operation allows the task to clear the message from the shared memory, when the work associated with this message is really terminated, and any further recovery does no longer require this message.

RES DEQ primitive

The action of this primitive is to restore a shared memory queue, followed by a dequeuing of the elements. A queue is said to be restored when a reset is performed on all dequeued, but not purged elements; therefore after a restore, it is possible to retrieve again elements that were initially dequeued but not yet purged. The ability to restore a queue is essential in building fault tolerant systems, since retrieved elements from the shared memory should be protected until they are no longer needed, and then only can they be completely removed from the shared memory.

Combining the Restore with the DEQ operation into a single primitive is necessary to ensure system integrity during recovery scenarios, as will be explained further.

SYSTEM CONCEPTS

From the programmer point of view, the machine structure (1) represents a single system, which means that for it, the actual number of processors is unknown and the system behaves as if it were a signal processor with a unique operating system.

It will be called 'Machine Operating System' (MOS) the one viewed by the programmer, and 'Local Operating System' (LOS) the one designed for real single processors.

The MOS is a multi tasking operating system which is distributed over several processors. The MOS is composed of identical functions that run in each processor. These local functions can be decomposed into two components:

- The LOS which has the responsibility of managing the local resources of each processor, including the scheduling of local tasks; as stated earlier, the LOS can be any operating system that already runs on the processor.
- The machine layer provides the inter task communication interface, that is the set of system calls for exchanging messages between tasks. It is responsible also for co-operation with other coprocessors to locate remote tasks, so the user would not be aware of the real location of the tasks.

Figure 3:
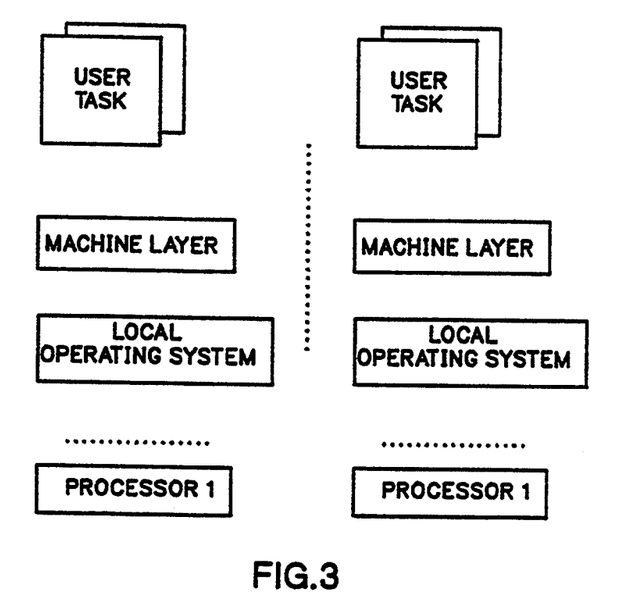
FIG. 3 schematically represents the structure of the operating systems underlying the machine structure of FIG. 1.

FIG. 3 schematically shows the decomposition of MOS functions.

The MOS has two types of system objects, which are tasks and message queues.

TASKS

A task is the execution, on a single processor, of a program consisting of instructions and initial data values. Several tasks can coexist at the same time on a single processor, and several processors can run in parallel.

Tasks are dynamic objects that can be created and deleted by other supervisor tasks. Besides the code that composes the program of the task itself, a task can invoke the services of the MOS through System Calls. According to the invention, in addition to usual services such as memory allocation and operations on timers, a task can send a message to another task in the system, wherever the latter is (e.g. on same or different processor); in both cases, the sending task does not know the real location of this correspondent within the multiprocessor system.

A task can execute on a processor as long as it can process its inputs; The decision of keeping a task on execution, is revisited each time the task issues a call for additional inputs. Typically, this decision depends on two conditions: the readiness of the requested input, and the priority level of other outstanding tasks of the same processor.

The action of ordering the task execution by the kernel is called 'scheduling'. This topic is specific to the LOS and thus falls outside the scope of the present subject. In the present specification, the scheduling mechanism for scheduling the various tasks is not critical, and will be supposed to be selected among any well-known scheduling mechanisms.

MESSAGE QUEUES

A message queue (or queue for short) is a dynamic object that can be created and destroyed by a task. A queue is a kind of mailbox where messages can be kept and then wait to be retrieved by a task that will issue a RECEIVE call on this queue. A queue respects the FIFO scheme: the oldest message in the queue is the first to be served.

In the present environment, queues are located in the shared memory.

FIG. 3 shows the MOS functions decomposition, every Local Operating system manages its local resources. The machine layer provides inter task communication calls.

As a rule, it will be admitted that each queue has a single owning task, which is the only task that has the right to read messages from it; the queue is owned automatically by the task that creates it.

When a queue is created, the MOS returns an identifier, a 'queueid', which is unique in the system. When a task intends to send a message to a queue, the task should issue an OPEN call first, to get the right to send messages. It issues then a SEND call, giving as a parameter the 'queueid' of the queue; the 'queueid' designates the destination of the message. To be able to dequeue a message from a queue, upon receipt of a message by said queue, the owning task should issue a RECEIVE call, with the 'queueid' as a parameter.

Figure 4:
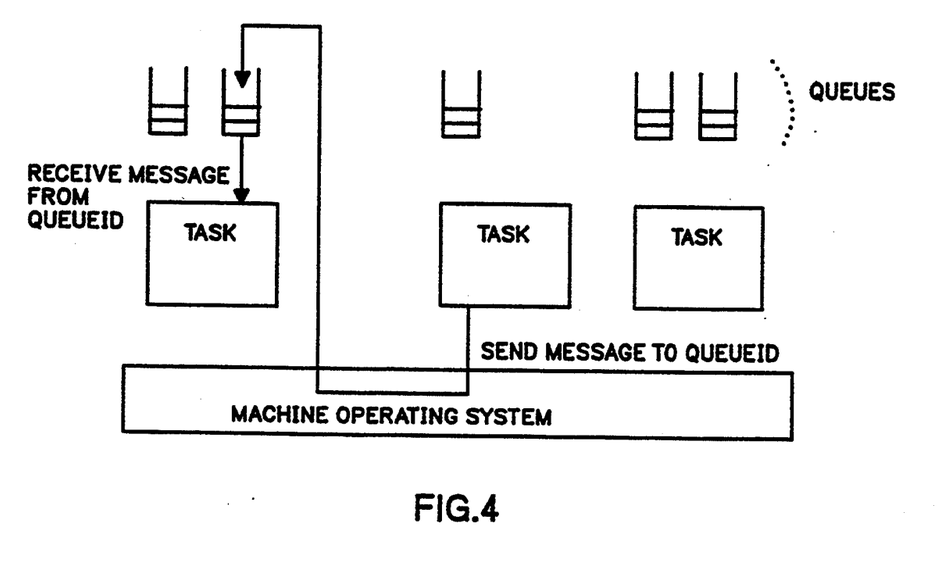
FIG. 4 gives a schematic representation of intertask message passing in the environment of FIG. 3.

FIG. 4 represents the system objects as they are viewed by the application programmer. For him, all tasks are bound by the same operating system and the actual number of processors is unknown.

SYSTEM CALLS DESCRIPTION

The system calls used for inter task communications and queue management, will now be described. They are:
OPEN
CLOSE
RESOLVE
SEND
RECEIVE

OPEN Call

To be able to send a message to a queue owned by another task, the sending task issues the OPEN call.

The OPEN call uses two parameters:

- a system name of the task, which is passed by the task to the machine layer. This is a name known by the programmer at the writing of his/her task program. A naming convention is supposed to exist between the writers of the sending and receiving tasks.
- a queueid, which is the identifier of the queue associated with this system name of the originating task, and which is returned by the machine layer.

CLOSE Call

When a task decides to stop sending messages to a given 'queueid', it issues the CLOSE call on this queue. This implies that a calling task is no longer able to send messages to this queue until it re-issues an OPEN call, the semantic of OPEN and CLOSE calls are indeed very similar to usual OPEN and CLOSE files in operating systems.

The CLOSE call uses a single parameter which is the queue identifier.

Locating a Queue: the RESOLVE call

Given that queues can be created and removed dynamically, one problem to solve is how a newly created queue can be located by the LOS of other processors; in other terms, how a task on another processor can get the identifier (i.e. queueid) of the target queue.

Actually, when an OPEN call is issued by a task, the LOS writes in the shared memory, in an address space known by all the LOS's, the record (queueid, system name, processor number). When a given task needs to get the 'queueid', it issues first the RESOLVE call, with two parameters:
- a system name, the one passed previously upon an OPEN call by the owning task;
- a queueid, which is a parameter returned by the LOS to the task.

When a RESOLVE call is issued, the LOS:
a. seeks from the shared memory the record whose 'system name' is the one passed during the call;
b. be gets the 'queueid', and passes it as a parameter to the calling task;
c. gets the 'processor number', to locate the placement of the queue.

Sending a Message: SEND Call

A task can send a message to a queue with the SEND call. An OPEN call should be issued previously, otherwise the call would fail.

The SEND call parameters are:
- queueid: this is the identifier of the queue where a copy of the message should be sent.
- message: this is the message to be sent. A copy of the message will be passed to the destination queue.

Receiving a Message: RECEIVE Call

The task that owns a queue can read messages from it by issuing a RECEIVE call. The task issuing a Receive Call should pass the pointer to a string of bytes, where the dequeued message will be copied.

The RECEIVE call parameters are:
- queueid: this is the identifier of the queue from where the message should be read.
- pointer: this is the pointer passed by the receiving task and where the machine layer will copy the message.

Message Passing Mechanism

Figure 5:
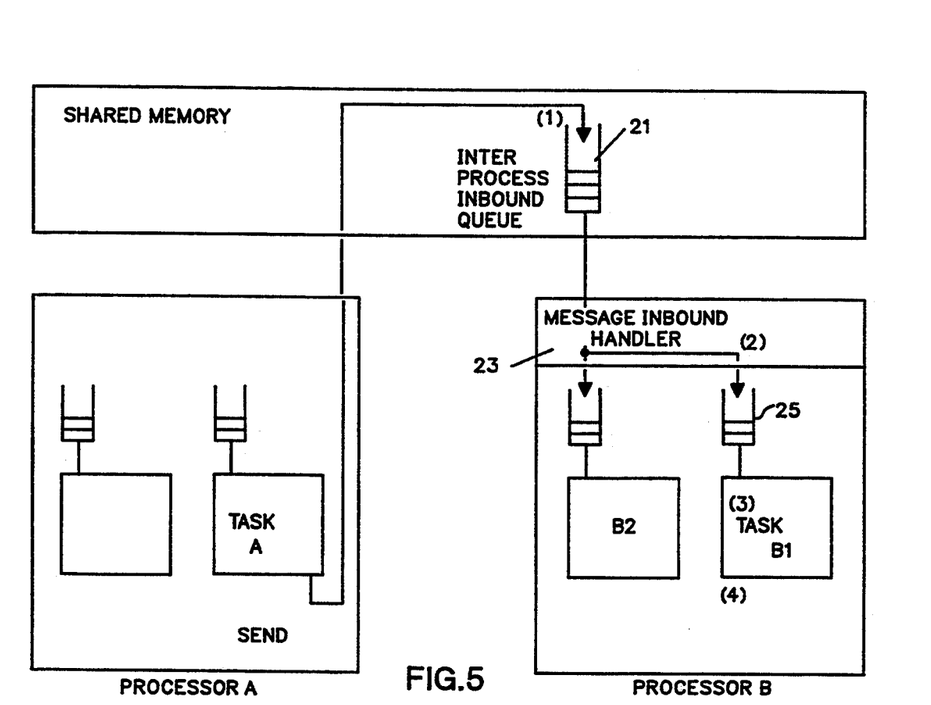
FIG. 5 represents a more detailed view of an interprocessor message passing mechanism according to the invention.

For the sake of clarity, message passing between processors will first be described (FIG. 5). Then, intra-processor message passing between tasks running on the same processor, will be described (FIG. 6).

The basic concept is to use a single queue in the shared memory per processor for all incoming messages from other processors. This means (21) is called an Inter Processor Inbound Queue or IPIQ for short. All inter processor messages for a given processor will be queued in this IPIQ (21).

A special task in each processor, acting as a server and called message inbound handler (MIH) (23) will have the responsibility of serving the IPIQ associated with the processor. The MIH (23) will dequeue periodically the inbound queue, and notify the LOS of the presence of messages for the target tasks; these tasks will be later on dispatched by the LOS following the local scheduling rules. The way in which the LOS is notified, is usually specific to a given operating system; as an example, a POST/WAIT EVENT function would fulfill this operation.

Figure 6:
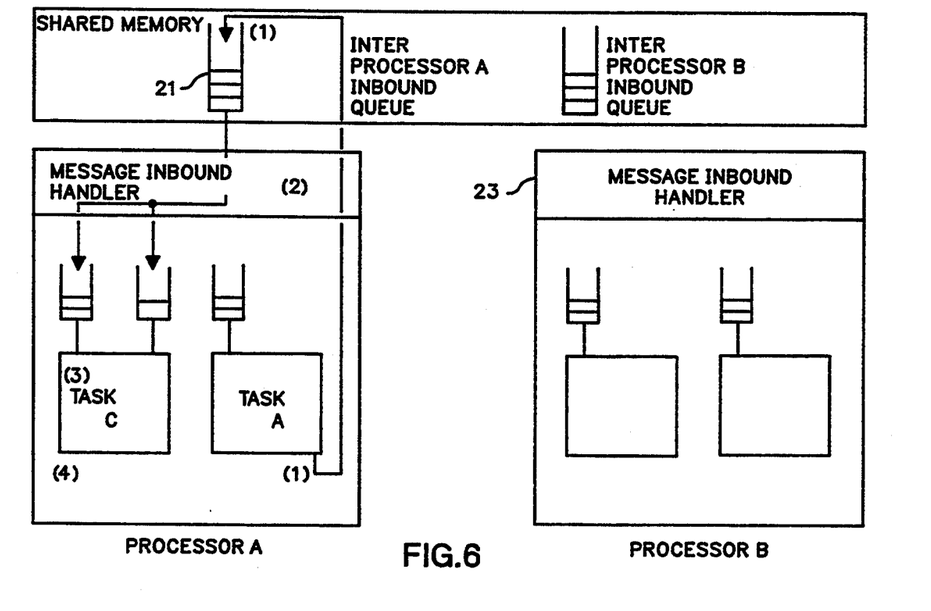
FIG. 6 represents a more detailed view of an intraprocessor message passing mechanism according to the invention.

FIGS. 5 and 6 summarize the message flow in both cases:

In FIG. 5, task A sends a message using the SEND call. In this call, there is a parameter specifying the 'queueid'. The procedure SEND uses this parameter to locate the real place of the destination queue, as explained in section "Locating a queue".

If the destination is local, for instance task A sending a message to task C in FIG. 6, the SEND procedure routes the message to the local queue feeding task C.

If the destination is for instance task B1 (FIG. 5), the SEND procedure enqueues the message in the IPIQ of processor B.

Some time later, the MIH of processor B will dequeue the message from the IPIQ and handle the message to the queues (25) feeding the local operating systems (LOS).

In either scenario, the receiving task will issue a RECEIVE CALL.

It has been noted previously that the purpose of the MIH is primarily servicing a single queue (21) where all messages from other processors are enqueued.

The most interesting point is that the message handler does not know a priori the state of the IPIQ, and there is no signalling from the PMI (e.g. an interrupt) to warn of the arrival of a message. This lack of signalling can be overcome by attempting a dequeue operation on the IPIQ, and discovering afterward that messages are outstanding. The problem associated with this scheme is the overhead caused by many unsuccessful dequeues in case of reduced traffic between processors.

The message handler is designed as a task (not interrupt driven) that has the lowest priority, with regard to application tasks. It is dispatched by the LOS periodically, the time interval between two dispatches being dependent on the load of the processor. The message handler will use a timer which will be a function of the number of outstanding messages in the IPIQ and of the time elapsed between two dispatches. With this scheme, it is ensured that the local processing has a priority over external messages, and that MIH is dispatched often enough to service the inbound traffic.

Whenever the MIH is dispatched, it tries to dequeue the maximum number of messages in a single operation to minimize the number of accesses to the shared memory. The number of messages the MIH is able to dequeue depends on the available storage for receiving messages in the local memory, and the real number of outstanding messages in the IPIQ.

In all cases, the real number of messages dequeued from the IPIQ will be less than the maximum number of messages that the local memory is able to store. Therefore, when issuing a DEQUEUE primitive on the PMI, the MIH specifies the maximum number of messages to transfer with parameter 'MAX'; the status code of the operation will give the real number of transferred messages.

Inter Processor Messages

Given the built-in redundancy of the shared memory queues in a preferred embodiment, all outstanding messages in the shared memory are protected from single hardware failures. There is still a problem in keeping this message protected until the destination task processes it and can pass to a point in the executing program, where in case of processor crash, the program can be resumed without any loss of data and from a meaningful state; this point is normally called 'recovery point' in the literature.

This problem was overcome with the ability of the shared memory to dequeue a message from a shared memory queue, without really deleting it: it is actually deleted only when an explicit purge on the message is issued. The timing for explicitly purging a message from the shared memory is when the receiving task finishes processing the message and establishes a new recovery point; at this moment, the message is no longer needed and can be removed entirely from the shared memory.

FIG. 5 shows the scenario for message passing to a protected task in another processor. The process for fault tolerant message passing includes the steps of:
1. Task A sends a message to a protected task B (B1 or B2) in another processor. The SEND call enqueues the message in B IPIQ (21).
2. The MIH dequeues the IPIQ. It tries to exhaust the queue from all messages. So far the message is dequeued from the IPIQ but not erased.
3. The receiving task when dispatched by the LOS processes the message.
4. When passing to next recovery point, the message is purged from the IPIQ.

Intra Processor Message Passing

Once again, given the built-in redundancy of the shared memory, it is possible to use the shared memory redundancies to protect the messages. One solution would be copying the message into the shared memory as a separate address space and erasing it when the message is treated by the receiving task. This solution presents a major drawback in managing shared memory address spaces; actually, given the size of messages, too many address spaces would be necessary to protect messages; moreover protecting the address space token of these address spaces would require an additional shared memory access. In brief, this solution would generate too much overhead on the processor.

A better solution is to use the processor IPIQ for both:
all messages from other processors; and
messages sent to a protected task in the same processor.

In other words, when a task sends a message to a local protected task, the message is enqueued in the processor IPIQ (rather than sent to the local queues immediately). Then the message is dequeued from the IPIQ in the same way described in the previous section. The steps of the intra-processor message passing process are:
1. the MIH gets the message from the IPIQ;
2. the receiving task processes the message;
3. when passing to next recovery point, the message is purged from the shared memory.

Thus two problems are solved:
1. how to protect local message passing; and
2. how to maintain FIFO order for these messages, Due to the design of the message handler as explained above, the order of the messages for local tasks is maintained.

FIG. 6 summarizes the scenario for message passing to a protected task in the same processor:
1) task A sends a message to Task C; the message is enqueued in A IPIQ
2) the message is dequeued by the MIH.
3) Task C receives the message.
4) Task C passes to next recovery point and the message is purged from the shared memory.

The application of the described intra processor and inter-processor message passing mechanism for achieving fault-tolerant multiprocessing will now be described.

As it was stated earlier, the message passing design provides the building block for architecting a fault tolerant machine. The intent of this section is to show how it allows a recovery after a processor crash, with a focus on message recovery.

The considered situation is when during normal operations, a processor crashes, and we would like to resume the activities of tasks that were running on the failed processor. The major problem raised by this scenario is how another processor can take over the failed one whatever the point of execution of the latter is.

For the sake of clarity, the following assumptions are made, for defining a fault tolerant model:
1. The granularity of protection is the task, not the processor.
2. Each protected primary task has a back up task that can be located on any other processor.

Primary task and its back up are created at the same time and with a single system call; their locations are specified within this system call. The primary task is active whereas the back up is passive; in other words, the primary performs all the operational work, while the back up waits for the establishment by the primary of recovery points.

3. The primary task synchronizes its operation with its back up by establishing regularity recovery points; this 'checkpoint' can be performed either by the underlying machine layer or by the task itself.
4. All operations on queues are part of the task context, and therefore the back up task has exactly the same information as the primary on the state of queues since the last recovery point.
5. An internal protocol between processors ensures that at any time, every processor has the knowledge of the operational processor. Such a protocol is known per se, and one such protocol is described in IBM Technical Disclosure Bulletin, Vol. 32, No. 5B, October 1989. Therefore, when a processor fails, the other processors are able to detect its absence in a short time, and take the necessary actions for recovery.
6. Each processor maintains a back up list of processors that contain protected tasks. As an example, let Ap be a primary task on processor Pa, its back up being processor Pb; thus the name of Pa figures in the list of processor Pb.
7. Every processor has the address of all Inbound Processor Queues; this address is known either by design or during system bring up.

Figure 7:
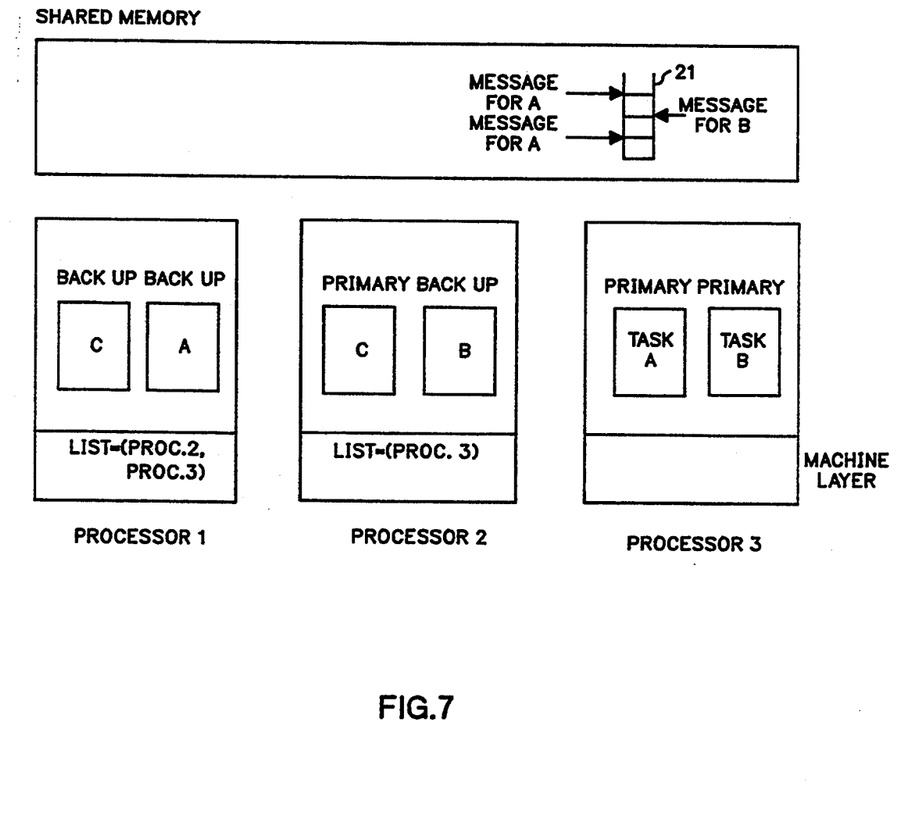
FIG. 7 represents a schematic view of the message passing mechanism according to the invention, when used in a fault-tolerant process of passing messages between tasks.

It is to be noted that the assumptions above are general enough to fit a wide range of fault tolerant systems. FIG. 7 shows an example of the model when transposed in the described multiprocessor system.

It is supposed that only primary tasks (A, B, C) are active while back up tasks remain passive. The list of Processor 2 is composed of the element 'processor 3' because it handles the back up of task A, which runs in processor 3.

BACKING UP SCENARIO

It is supposed that a processor fails, for example Processor 3 fails.

Take Over of Primary Tasks

By means of the internal protocol between processors, the operational ones (P1 and P2 in the example) discover that P3 crashed; the protocol is assumed sure enough to derive a decision for taking over. At that point, every processor checks its back up list. If the list is empty, no action is performed since this processor does not contain any back up task for the failing processor.

If the list is not empty (list of P1=(P2, P3) and list of P2=(P3)), the processor will perform the following actions.

1. It restores and dequeues all the elements from the IPIQ of the failing processor; this is done with the indivisible shared memory primitive RES_DEQ, which restores first the queue and then dequeues all the elements (without purging them) from the PM queue.

The fact that the RES_DEQ is indivisible is essential here. Actually, restoring the queue to its initial state is necessary in order that dequeued messages, but not purged ones, can be re-integrated. But given the possible contention on this queue by several processors, restoring the queue should be followed immediately by an exhaustive dequeue.

2. It discards all messages the destination of which is a primary task having a back-up located on another processor. This means, for processor 1: all messages for task B are discarded.

Actually, since the processor has the list of all its back up tasks, it is able to detect whether the messages should be received by the local back up tasks or not.

3. The remaining messages are delivered to local back-up tasks. For processor 1, this means all messages to task A are passed to its back-up.

4. When the processing of the RES_DEQ operation is finished, the processor that issued this primitive, broadcasts to all other operational processors, the message:

BACK_UP_RESUME with a list of task names and its processor number,
to indicate to other processors that its back up tasks can now resume the operations of the failed ones.

In the example, Processor 1 would send to Processor 2, the message 'BACK_UP_RESUME, (TASK A), PROCESSOR 1', and Processor 2 sends to Processor 1, the message 'BACK_UP_RESUME, (TASK B), PROCESSOR 2.

The way how this message is exploited by the receiving processor is explained below.

Message Passing

It is assumed that P2 discovers the failure of P3.

All messages to tasks located on P3 (TASK A and TASK B) will be withheld, until a BACK_UP_RESUME message arrives with the list of task names and the processor name. In the example, P2 expects to receive the following message:

BACK_UP_RESUME (TASK A), PROCESSOR 1.

Receiving this message indicates to the machine layer, that all messages to the task the name of which figures in the list, can now be sent again to the IPIQ of the processor, the name of which figures in the message; again in the example, this implies that Processor 2 should now send all messages to Task A via the IPIQ of Processor 1.

What is claimed is:

1. In a multi-processor system comprising a plurality of processors coupled by a shared memory and running a plurality of sending and receiving tasks, and wherein each processor is provided with a local operating system and an intertask communication interface for managing system calls issued by the tasks, a method for passing messages between said plurality of sending and receiving tasks, comprising steps in each said processor of:

allocating to each said processor a separate interprocessor inbound queue space in said shared memory;

issuing an open system call from said sending task running in a first said processor to said intertask communication interface of said first processor which interface identifies in response to said open system call, the location in said shared memory allocated to said separate interprocessor inbound queue of a second processor running said receiving task corresponding to said sending task;

issuing a sending system call by said sending task running in said first processor to said intertask communication interface of said first processor, said sending system call comprising the identification of the location in said shared memory of said separate interprocessor inbound queue of said second processor and of the messages to be passed from said sending to said receiving tasks;

activating a serving program means running in each said processor for periodically dequeuing messages from said separate interprocessor inbound queue allocated to each said processor; and issuing a receive system call by said receiving task to said intertask communication interface of said second processor running said receiving task, which processor provides the messages dequeued from said separate interprocessor inbound queue to said receiving task.

2. A method as claimed in claim 1, further comprising:

executing a message inbound handler task (MIH) in said second processor running said receiving task at time intervals set by said second processor as a function of its load, said MIH dequeuing messages from said separate interprocessor inbound queue and passing said messages to a local storing means feeding the local operating system executed by second processor.

3. A method as claimed in claim 1 or 2, further comprising:

running in each said processor, in addition to its own sending and receiving tasks, secondary sending and receiving tasks as backup tasks corresponding to sending and receiving tasks running in another said processor, said backup tasks being executed when said another processor running said corresponding sending and receiving tasks fails.

4. In a multi-processor system comprising a plurality of processors coupled by a shared memory and running a plurality of sending and receiving tasks, each processor being provided with a local operating system and an intertask communication interface for managing system calls issued by said tasks, means for passing messages between said plurality of sending and receiving tasks running in separate said processors, comprising:

means for allocating to each said processor a separate interprocessor inbound queue space in said shared memory;

means for issuing an open system call by said sending task running in a first said processor to said intertask communication interface of said first processor;

means connected to receive said open system call from said sending task and for providing, in response thereto, an identification of the location in said shared memory allocated to said separate interprocessor inbound queue of a second said processor running said receiving task corresponding to said sending task;

means for issuing a sending system call by said sending task to said intertask communication interface of said first processor, said call including the identification of the location in said shared memory of said separate interprocessor inbound queue and of the messages to be passed;

means for activating a serving means running in each said processor for periodically dequeuing messages from said separate interprocessor inbound queue allocated to each said processor; and means for issuing a receive system call by said receiving task to said intertask communication interface of said second processor running said receiving task and means responsive thereto for providing said messages dequeued from said separate interprocessor inbound queue to said receiving task.

5. A system as claimed in claim 4, wherein said serving means further comprises:

means for executing a message inbound handler task (MIH) in said second processor running said receiving task at time intervals set by said second processor as a function of its load, said MIH dequeuing messages from said separate interprocessor inbound queue and passing said messages to a local storing means feeding the said local operating system executed by said second processor.

6. A system as claimed in claim 4 or 5, further comprising:

means in each said processor for running secondary sending and receiving tasks as backup tasks corresponding to sending and receiving tasks running in another said processor; and means for executing said backup tasks when another said processor running said corresponding sending and receiving tasks fails.

* * * * *